March 27, 1951 W. SWIFT ET AL 2,546,567
MACHINE FOR WINDING COILS FOR DYNAMOELECTRIC MACHINES
Filed Jan. 21, 1948 4 Sheets-Sheet 1

Inventors
W. Swift
F. Mason
By ... Attys

Patented Mar. 27, 1951

2,546,567

UNITED STATES PATENT OFFICE 2,546,567

MACHINE FOR WINDING COILS FOR DYNAMOELECTRIC MACHINES

William Swift, Sutton Coldfield, and Ernest Mason, Quinton, Birmingham, England, assignors to Joseph Lucas Limited, Birmingham, England Application January 21, 1948, Serial No. 3,586
In Great Britain January 2, 1947

9 Claims. (Cl. 140—92.2)

This invention has for its object to provide an improved machine for winding wire coils for the rotary armatures of dynamo-electric machines.

The invention comprises the combination of a hollow rotary spindle, a chuck mounted on one end of the spindle, a plurality of coil-former jaws pivotally mounted on the chuck, a slidable rod in the spindle for actuating the former jaws, a pair of wire gripping jaws carried on and situated at one side of the chuck, a wire cutter associated with the gripping jaws, and a sleeve slidable on the spindle for actuating the gripping jaws.

Figure 1:
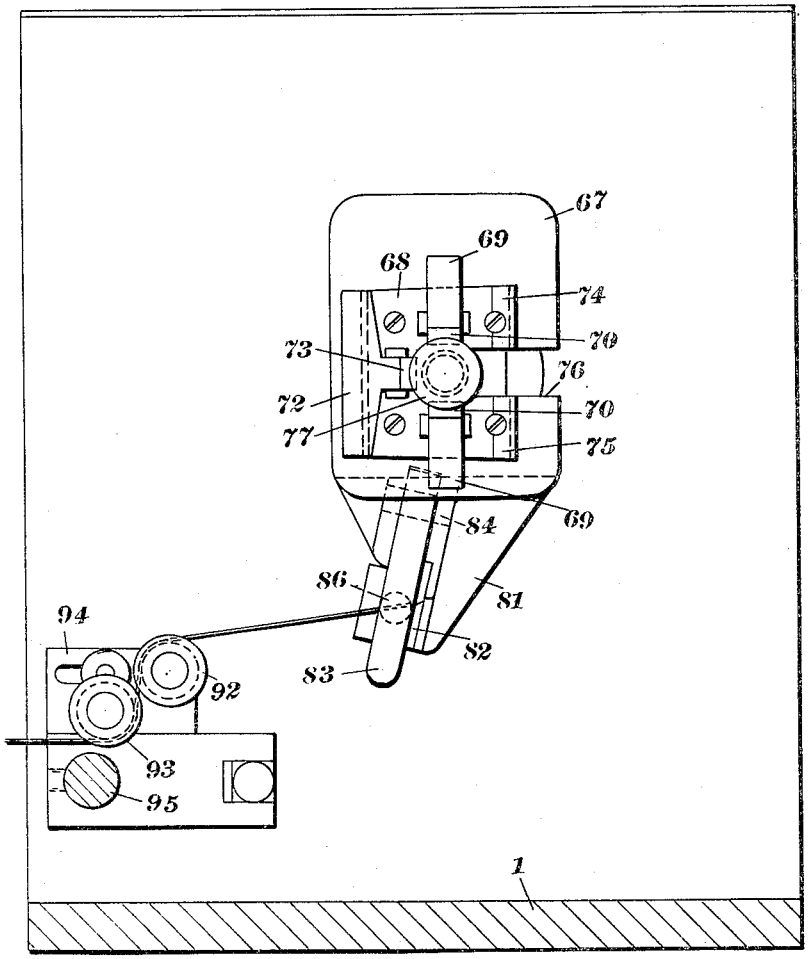
Figure 1 is an end view of the chuck upon which the coils are wound in a coil winding machine constructed in accordance with the invention.

In carrying the invention into effect according to one convenient mode as illustrated in the drawings, the coil winding machine comprises a base 1 and end frames 2 in which bearing housings 3 and 4 are carried. A drive pulley 5 is keyed to a sleeve 6 which is rotatably supported in a bearing 3ª and also rotatably supports a spindle 7 the right-hand portion of which is hollow and is carried in a bearing 8 which is arranged to prevent longitudinal movement of the spindle. A dog clutch member 9 slidable on the spindle 7 is adapted to cooperate with complementary dog teeth on the sleeve 6. The member 9 has teeth 10 forming a sliding connection with corresponding teeth on a member 10ª pinned to the spindle 7. A spring 11 urges the clutch member 9 in a direction to engage the clutch teeth with the corresponding teeth on the sleeve 6. A compressed air cylinder 12 is pivoted to one of the end frames 2 at 13, and contains a piston 14 which is connected to an eye 15ª at the upper end of a lever 15 pivoted at 16 to the base 1. The lever 15 is formed with a second eye 17 surrounding the spindle 7 and having inwardly projecting pins 18 which engage a groove in a collar 19 slidable on the spindle and carrying a pin 20 extending through slots 21 in the hollow portion of the said spindle and secured to a rod 22 slidable within said hollow portion and extending at its outer end through the corresponding end of the spindle which carries the winding chuck to be hereinafter described. Suitable connections are provided (not shown) whereby compressed air may be supplied to one or other side of the piston 14 under the control of push button or equivalent devices such as a pedal by which means the lever 15 may be rocked in the direction desired and will thereby impart longitudinal motion to the rod 22.

A gear 23 secured to the spindle 7 drives through an idler 24 a gear 25 on a parallel shaft 26 carrying a worm 27 which drives a worm wheel 28 on a cross shaft 29 supported in bearings in frame members 30. The cross shaft 29 carries a cam 31 having a follower 32 secured to a lever 33 the upper end of which is pivoted at 34 to the frame and the lower end of which is connected to a tension spring 35 anchored to the frame at 36 whereby the follower is maintained in engagement with the cam surface. A shaped projection 37 secured to one side of the cam 31 is arranged to engage, during rotation of the cam, with a roller 38 on an arm 39 the lower end of which is secured to a horizontal shaft 40 carried in a fixed bearing 41 and having secured to its other end an arm 42 with a forked end carrying inwardly extending pins 43 engaging in a groove in a collar 44 slidable upon the spindle 7.

Figure 3:
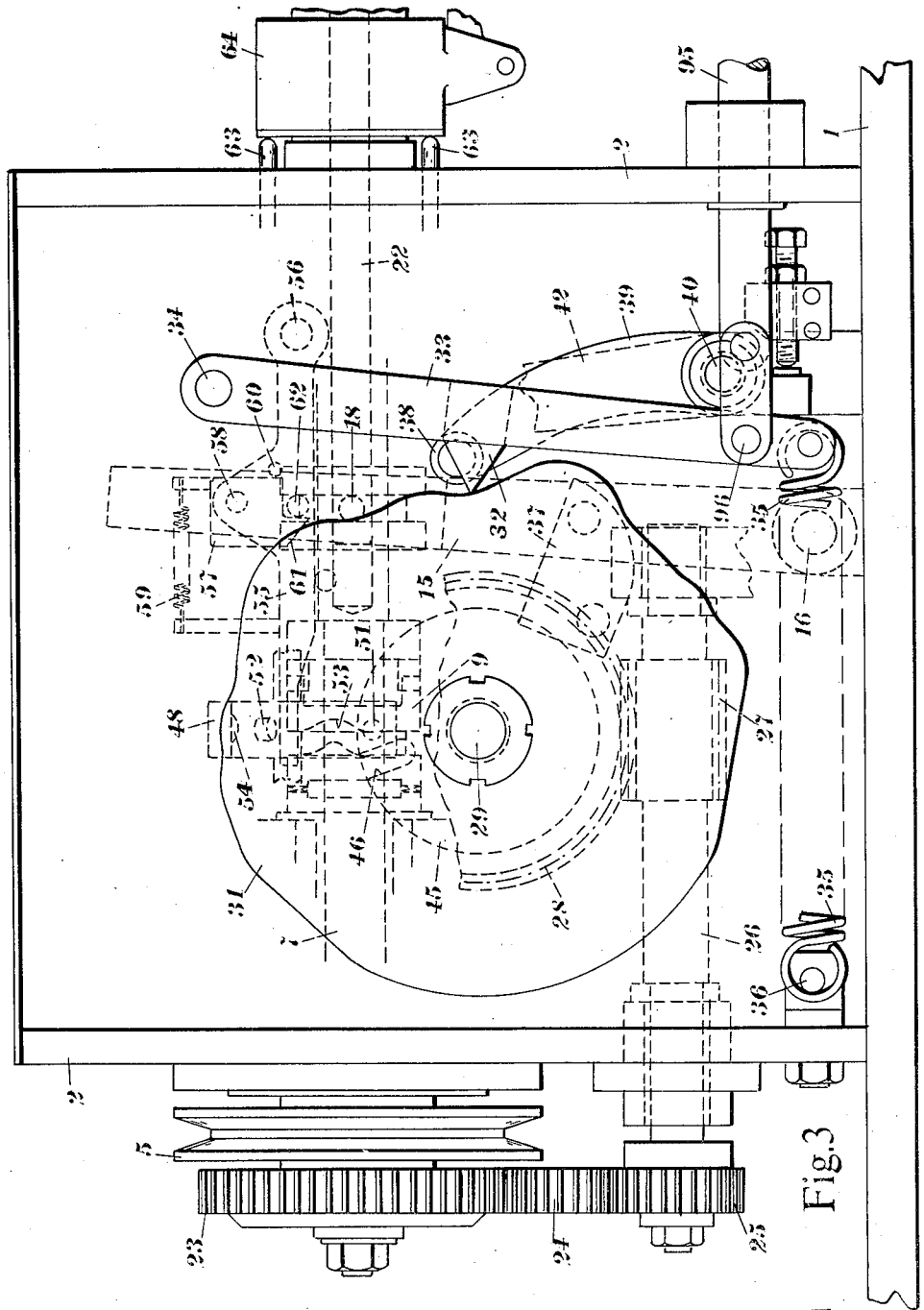
Figure 3 is a side elevation of a part of the machine showing the main controlling cam.
Figure 4:
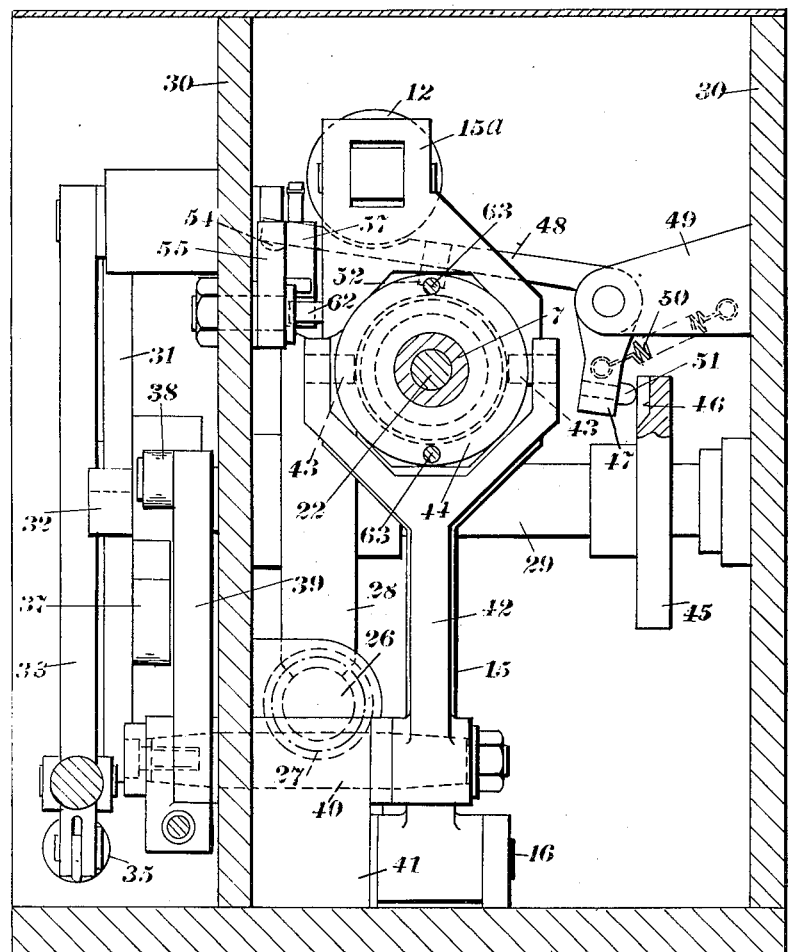
Figure 4 is a cross-section of the machine taken on the line 4—4 of Figure 2.

The cross shaft 29 also carries a disc 45 having therein a radial groove 46. A bell-crank lever having arms 47 and 48 is pivoted to a bracket 49 and is loaded by a spring 50 to cause a peg 51 on the arm 47 to enter the groove 46 when the disc 45 occupies an appropriate position. The arm 48 of the bell-crank lever has a peg 52 adapted, when the arm is lowered, to engage a cam groove 53 in the slidable clutch member 9, said groove comprising a deflected portion which the peg 52 can enter when the clutch is engaged and a straight portion which when engaged by the peg causes disengagement of the clutch. A stud 54 at the further end of the lever arm 48 may be engaged by one end of a lever 55 lying below said stud, this lever being pivoted at 56 to the frame. A pawl 57 pivoted to lever 55 at 58 is loaded by a spring 59 against a stop pin 60. The inclined surface 61 of the pawl is arranged to be engaged by a pin 62 on lever 15 when the latter is moved from left to right as viewed in Figure 3, this action causing the lever 55 to be lifted. When the lever 15 is moved from right to left, the pawl 57 swings about its pivot 58 and allows the pin 62 to pass.

The slidable collar 44 on the spindle 7 is arranged to engage a pair of pins 63 slidable in the bearing casing 4 and with their opposite ends engaging a sleeve 64 also slidable on the spindle outside the end frame 2. The sleeve 64 has a pair of opposite longitudinal slots which engage the ends of a pin 64a secured in the rod 22. The end of the hollow portion of the spindle 7 is formed with a flange 65 on which is mounted a plate 66 to which is secured the chuck body 67, the latter being formed with a quadrilateral block 68 constituting a coil-former, the section of which corresponds to that of the quadrilateral coil to be wound thereon. A pair of narrow jaws 69 are pivotally mounted for movement about parallel axes on opposite sides of the block 68. The inner end of each jaw is provided with a rounded projection 70. The inner faces of the jaws 69 are shaped to form with the outer face of the chuck part 67 a pair of narrow slots 71 for holding the wires in opposite sides of the coil in parallel relation. It will be understood that these narrow jaws serve to support the central parts of the respective coil sides. A third jaw 72 having a width equal to that of the third side of the block 68 is pivotally mounted for movement about an axis at right-angles to the axes of the jaws 69 and is provided with a similar rounded projection 73. The opposite side of the block 68 is provided with fixed jaw members 74, 75 separated by a slot 76 for a purpose to be described later. The end of the slidable rod 22 extends through the chuck body and is provided with a head 77 adapted when the rod is retracted to open the jaws 69 and 72. The rod 22 also carries a fixed collar 78 forming an abutment for a spring 79 bearing on a slidable sleeve 80 formed to engage the projections on the jaws 69 and 72 to close the latter when the rod 22 is moved in the opposite direction.

The plate 66 previously referred to has a radially extending arm 81 which is adapted to serve as a wire gripping jaw and is also provided with a wire cutting element 82. A movable jaw 83 of bell-crank form is pivoted at 84 and has a recessed portion 85 adapted to co-operate with an abutment 86 slidable in the fixed arm 81 and loaded by a spring 87, movement of the member 86 being limited by a stop 88. One end of the movable jaw 83 is formed with a cam surface 89 co-operating with a roller 90 on the sliding sleeve 64. A spring 91 is provided for imparting an opening movement to the jaw 83 when permitted by the roller 90.

The wire to be wound is passed between a pair of grooved rollers 92, 93 carried by a bracket 94 slidably mounted and secured to a slidable rod 95, the end of which is pivotally connected at 96 to a point near the lower end of the lever 33.

Figure 2:
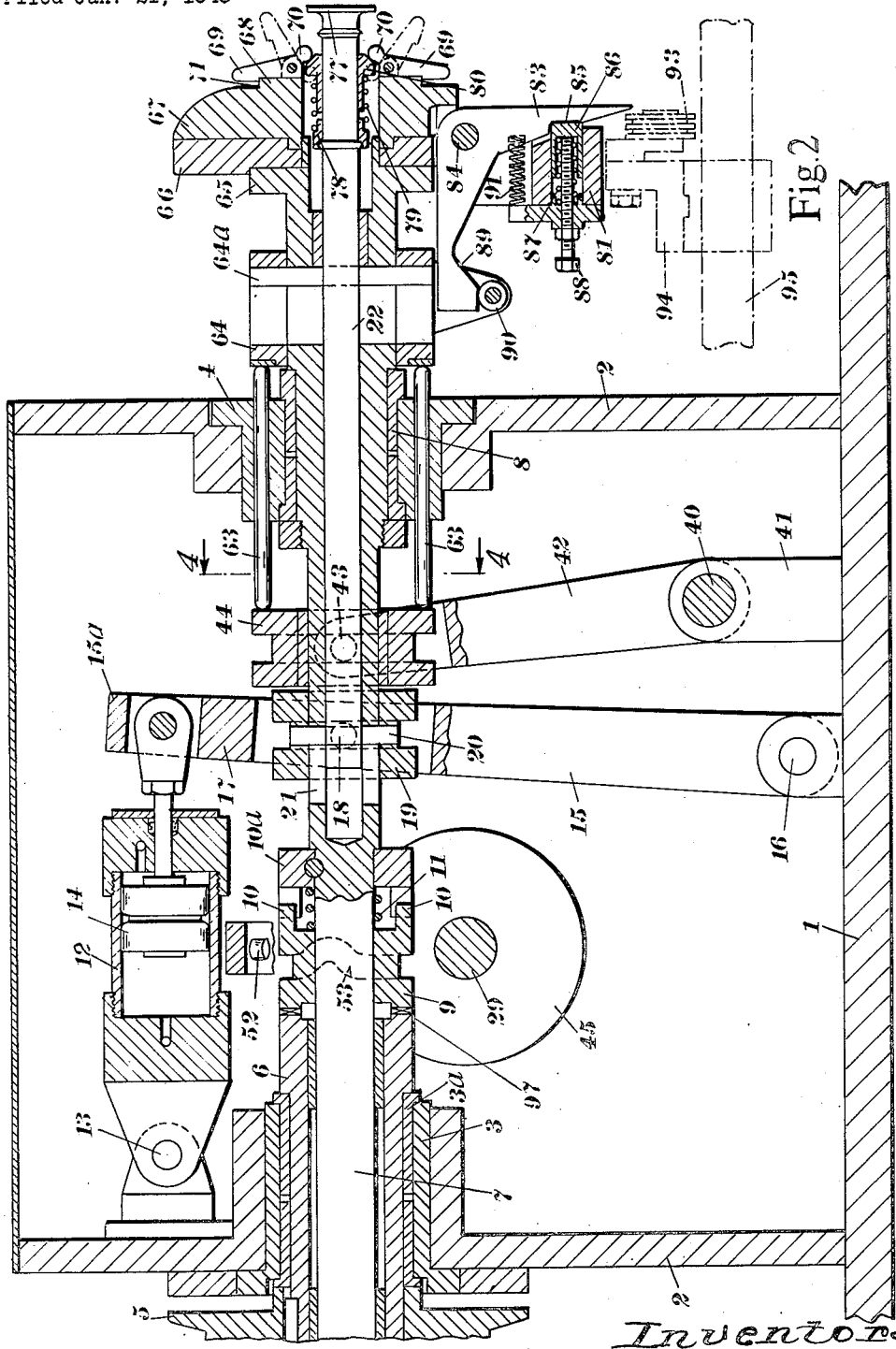
Figure 2 is a longitudinal sectional elevation of the machine.

In operating the machine the wire or wires from a supply reel or reels are drawn through the grooved rollers 92, 93 and the ends secured between the pivoted gripping jaw 83 and the fixed jaw abutment 86. At the commencement of winding said rollers occupy a position to the right of that shown in Figure 2, so that they lie in or near the plane of the slots 71. At this time the driving pulley 5 is being rotated by a suitable power source but the clutch 9 is held out of engagement by the peg 52 of lever 48 lying in the straight part of the groove 53, and the sliding rod 22 is in its extreme left-hand position as viewed in Figure 2, the chuck jaws 69 and 72 being open and the piston 14 in its extreme left-hand position. The operator then causes compressed air to be admitted to the left-hand side of cylinder 12, thereby actuating the lever 15 to the right causing the rod 22 to move in the same direction and close the chuck jaws. During this operation the pin 62 on the lever 15 engages the inclined surface 61 of the pawl 57 and lifts the lever 55 which engages the underside of lever arm 48 and lifts the latter, thereby withdrawing the peg 52 from the cam groove 53 and allowing the clutch member 9 to be moved into engagement with the sleeve 6 by its spring 11. The drive will now be transmitted from the pulley to the spindle 7 and to the parallel shaft 26 and the wire will be coiled upon the rotating chuck.

Rotation of the disc 45 on shaft 29 moves the groove 46 out of line with the pin 51 on lever arm 47 and thus prevents the return of this lever until the cycle operations has been nearly completed. At the same time the surface of cam 31 imparts the required to and fro movement to the wire guiding rollers 92, 93 through the lever 33 and rod 5, to dispose the successive convolutions of the coil in the desired manner. When the required number of turns have been wound, the projection 37 on the cam engages the roller 38 on arm 39 and thereby rocks the arm 42 to displace the collar 44 and thence the sleeve 64 which allows the jaw 83 to open and release the previously gripped end of the wire. This action takes place about 90° before the chuck has reached the position in which it is shown in Figure 1, the direction of rotation being anti-clockwise. Further rotation of the chuck to bring it into the position shown in the Figure 1 causes a continuous portion of the wire to enter beneath the open jaw 83 and at this point rotation of the chuck is stopped by the disengagement of the clutch 97 brought about by the entry of the peg 52 in the cam groove 53 during the last revolution of the chuck. The operator then admits compressed air to the right-hand side of cylinder 12 to actuate the lever 15 and thereby displace the rod 22 to the left as viewed in Figure 2 to open the chuck jaws. The displacement of rod 22 also returns the sleeve 64 to its initial position by engagement of the pin 64a in the slots in said sleeve and thereby closes the jaw 83. This closing movement of the jaw first brings the recessed edge 85 thereof past the cutting edge of element 82 and thereby severs the previously formd coil from the wire, the end of the latter being then gripped by the jaw in readiness for the formation of the next coil. The chuck jaws being open, the severed coil is removed, this being preferably done after attaching a clip to the side of the coil lying across the slot 76 at the side of the chuck. The cycle of operations is then repeated for the formation of the next coil.

It will be understood that when the coil is required to be formed from two or more independent wires these are supplied from separate reels and are coiled simultaneously in a similar manner to that above described.

This invention enables the winding of armature and similar coils to be effected in a convenient and expeditious manner and with economy of wire, none of the wire being cut to waste in the severing operations.

Having thus described our invention, what we claim as new and desire to secure by Letters Patent is:

1. In a machine for winding wire coils for dynamo-electric machines, the combination of a hollow rotary spindle, a chuck body mounted on one end of said spindle and provided at one side with a coil-former on which the wire required to form the coils can be coiled, a plurality of wire-retaining chuck jaws pivotally mounted on said chuck body, a rod slidably mounted in said hollow spindle, means on said rod for actuating said chuck jaws, means for imparting sliding movements in opposite directions to said rod, a pair of wire-gripper jaws carried on and situated at one side of said chuck body for enabling wire gripped at one end by said wire-gripper jaws to be coiled on said coil-former during rotation of said spindle, a sleeve slidable on said spindle for actuating said wire-gripper jaws to cause the latter to release the end of the wire coiled on said coil-former and re-grip the wire at another position, means for imparting sliding movements in opposite directions to said sleeve, and a wire cutter associated with said wire-gripper jaws for cutting the wire during the re-gripping action of said wire-gripper jaws on the wire.

2. In a machine for winding wire coils for dynamo-electric machines, the combination of a hollow rotary spindle, a chuck body mounted on one end of said spindle and provided at one side with a quadrilateral coil-former on which the wire required to form the coils can be coiled, three wire-retaining chuck jaws pivotally mounted on said chuck body to retain the wire on three sides of said quadrilateral coil-former, a fourth wire-retaining chuck jaw fixed on said chuck body to retain the wire on the other side of said quadrilateral coil-former, a rod slidably mounted in said hollow spindle, means on said rod for actuating the pivotally mounted chuck jaws, means for imparting sliding movements in opposite directions to said rod, a pair of wire-gripper jaws carried on and situated at one side of said chuck body for enabling wire gripped at one end by said wire-gripper jaws to be coiled on said coil-former during rotation of said spindle, a sleeve slidable on said spindle for actuating said wire-gripper jaws to cause the latter to release the end of the wire coiled on said coil-former and re-grip the wire at another position, means for imparting sliding movements in opposite directions to said sleeve, and a wire cutter associated with said wire-gripper jaws for cutting the wire during the re-gripping action of said wire-gripper jaws on the wire.

3. A machine according to claim 2, in which the fixed chuck jaw and one of the pivotally mounted chuck jaws are situated opposite to each other and are equal in width to the corresponding sides of the rectangular coil-former.

4. A machine according to claim 2, in which the fixed chuck jaw is composed of two parts spaced apart to permit access to the wire coiled on the coil-former.

5. A machine according to claim 1, in which the means for imparting sliding movements in opposite directions to the rod comprise a pneumatically operable actuating device, and means including a lever interconnecting said device and rod.

6. A machine according to claim 1, in which the wire-gripper jaws comprise a member projecting laterally from the chuck body, a spring-loaded abutment on said member, and a jaw pivotally mounted on said member for co-operating with said abutment, the wire cutter being secured to said member at a position adjacent to the pivotally mounted jaw.

7. A machine according to claim 1, in which the means for imparting movements to the sleeve comprise in combination a rotary member, a lever operable by said rotary member, means for moving said sleeve in one direction under the action of said lever, and means on the chuck jaw actuating rod for moving said sleeve in the opposite direction.

8. A machine according to claim 1, and having guide means for the wire to be coiled on the chuck, a slidable member on which said guide means are mounted, a spring-loaded lever connected to said slidable member, and a rotary cam for actuating said lever to cause reciprocatory movement of said slidable member and guide means.

9. A machine according to claim 1 and having a clutch through which rotary motion is transmissible to the spindle, a movable member for controlling said clutch, and means for actuating the clutch-controlling member simultaneously with movement of the chuck-jaw controlling rod in one direction, so that said clutch is brought into action when the chuck jaws are closed.

WILLIAM SWIFT.
ERNEST MASON.

REFERENCES CITED

The following references are of record in the file of this patent:

UNITED STATES PATENTS

| Number | Name | Date |
| --- | --- | --- |
| 1,515,309 | Meissner | Nov. 11, 1924 |
| 1,600,258 | Van Veen | Sept. 21, 1926 |
| 1,807,199 | Dear | May 26, 1931 |
| 2,379,666 | Swartz et al. | July 3, 1945 |

FOREIGN PATENTS

| Number | Country | Date |
| --- | --- | --- |
| 183,169 | Great Britain | July 17, 1922 |